United States Patent Office 3,594,342
Patented July 20, 1971

3,594,342
PROCESS FOR THE INTRODUCTION OF ADDITIVES INTO PLASTIC AND WAX MELTS
Mandred Ratzsch, Leuna, and Rolf Kilian, Bad Durrenberg, Germany, assignors to VEB Leuna-Werke Walter Ulbricht, Leuna, Germany
No Drawing. Filed Sept. 22, 1967, Ser. No. 669,681
Int. Cl. C08f 11/70
U.S. Cl. 260—28.5                                   8 Claims

ABSTRACT OF THE DISCLOSURE

Process for the introduction of additives into plastic and wax melts by means of a concentrated solution or dispersion of said additives wherein as solvents or dispersants molten copolymers of ethylene with vinyl acetate or with acrylic esters of a mean molecular weight ranging from 1200 to 8000 are used.

---

It is known to subject plastics, for instance polyethylene, to a so-called dry-mixing process by adding powders of lamp-black, dyes, stabilizers, etc. to granulated plastic materials and mixing them together in extruders with simultaneous plastification (see "Rubber & Plastics," 42, 3 283 (1961)).

Another known process for improving the coloring capacity of polyolefins capable of being shaped by extrusion presses, consists of mixing the polyolefins, before undergoing extrusion, with 0.1 to 20% by weight with polymers which are soluble or emulsifiable in the molten polyolefins, have a molecular weight of about 1000, and exhibit good affinity to dyes. Especially suitable for the purpose are polyalkylene imines, polyesters, polyurethanes, and epoxy resin mixtures.

It is, however, a drawback of the last-mentioned process that a concentrate has first to be prepared in a separate operation, which has then to be mixed with the polyolefin and that the solubility or dispersability of the dyes is not really high. Since, furthermore, comparatively large amounts of said polymers are introduced into the polyolefins, to be colored with the concentrates mentioned, the electrical parameters of the latter are impaired.

It is already known that it is more advantageous to make use of the so-called "master-batch" process, by first preparing coloring or stabilizing concentrates from the same polyolefin which is being processed, and to incorporate the concentrates in a second stage into the product to be colored or stabilized.

This makes it possible not only to avoid the above described shortcomings, but it also has the advantage that fluctuations in dosage are less harmful due to the relatively high amount of the concentrate as compared to the amount of powder. The more even distribution of the additive in the plastic mentioned above as desirable, is likewise realized in this manner.

The polyethylene concentrates used in that process contain varying amounts of additives, which range from 5 to 50% by weight. Concentrates of pigments usually contain 20–40% by weight, concentrates of lamp-black 25–50% by weight, and stabilizer concentrates 5–10% by weight of a stabilizer.

Polyethylene concentrates are made, as a rule, in interior mixing devices by incorporating the additives into the polyethylene by use of kneading or shearing forces at a temperature between 80 and 180° C. The viscous melt so formed is, after discharge from the mixer, fed into a worm press with head granulation device or withdrawn in the form of a ribbon through a cooling device and thereafter granulated.

The last mentioned process has the disadvantage that it requires expensive equipment. It is a further inconvenience that in the preparation of lamp-black and dye concentrates, in changing over from one additive to another, the interior of the mixing devices, which is only accessible with difficulty, is hard to clean from adhering residues of lamp-black or colorants. On the other hand, economical considerations make it impossible to provide a separate mixing device of the interior mixing type for each additive to be used.

According to yet another known process polypropylene, polyethylene, or polystyrene are dyed by wetting them in powder form with 0.65–1% by weight of an organic swelling agent and admixing pigment thereto (published Japanese patent application 12,785). The difficulty with that method is the cumbersome removal of the swelling agent. It is another shortcoming of the method that it is only applicable to polymers in powder form because of the intended swelling. Thus high-pressure polyethylene that is usually obtained in the form of granules, would first have to be ground to powder and that, again, is an added expense, making the process uneconomical.

A similar process consists in processing granular polymers by mechanical mixing with viscous polyiso-butylene-containing dispersions of dyes in a volatile solvent for polyiso-butylene and applying a colored coating thereon, whereupon they are homogenized in a worm press and thus colored evenly (DAS 1,142,235).

There is another known process for incorporating lamp-black in even distribution in polyolefins, by subjecting the polyolefin before admixture of the lamp-black to a high-frequency ionization radiation or UV radiation. Thereby a better distribution of the lamp-black can be achieved (British Pat. 956,806). The drawback of the process is the expensive pretreatment of the polyolefin before the dyeing. Moreover, the process is obviously not suitable for pigment application.

Another process is known in which hydrocarbon wax having a melting point between 50 and 93° C. is mechanically mixed with a sparingly dispersible pigment in the ratio 1:1, and brought to and maintained at a temperature above the melting point of the wax up to the time when a homogeneous dispersion has been formed. Subsequently, the dispersion is mixed with a polymer melt to be colored, until agglomerations are no longer present. (U.S. 2,512,459).

Furthermore, it is known to prepare a concentrate from 40–70% by weight of a coloring pigment with 60–30% by weight of a polyethylene wax having a molecular weight of 500–5000. Such a concentrate is well suited for coloring plastic masses (British Pat. 906,973).

While the last two mentioned processes are suitable for coloring plastic melts, they, too, have drawbacks. By the addition of crystalline polyethylene waxes to plastics the corrosion of such plastics upon stress cracking is considerably increased and their mechanical properties are impaired, so that their use is limited.

Yet another process is known for making shaped products from polyethylene and lamp-black with the use of a concentrate consisting of a mixture of lamp-black and a copolymer consisting of 50–95% by weight of ethylene and 50–5% by weight of an ethylenically unsaturated carboxylic ester. While in the subsequent incorporation of the concentrate into plastics by means of wormshaft machines a good and even distribution of the lamp-black will take place (DAS 1,226,782), the process has the disadvantage that due to the high viscosity of the melt of the copolymers used for making the concentrate expensive kneading devices with subsequent granulating machinery has to be used.

It is the object of the present invention to provide a process which permits to avoid the drawbacks of the known processes and to obtain polymers in which additives, such as coloring materials, stabilizers, or other additives will be evenly distributed in the polymers with simple operations and inexpensive machinery.

Other objects and advantages will become apparent from the following detailed description.

According to the invention these objects are achieved by preparing concentrates of additives to be incorporated into the melts of plastic materials or waxes with the use of molten copolymers of ethylene with vinyl acetate or with acrylic esters of a mean molecular weight ranging from 1200 to 8000, said copolymers serving as solvents or dispersants for the additives. The preferred molecular weight is from 1500 to 5000.

The preparation of the concentrates, whether they be solutions or dispersions, is effected in a manner known per se.

The contents of vinyl acetate or of esters of acrylic acid in the copolymer to be used as solvent or dispersant for the additives, are from 1–20% by weight, the preferred amount being 2–10% by weight.

As additives we may mention dyes, lamp-black and stabilizers, for instance 2,2'-methylene-bis-6-methylcyclohexyl-4-methylphenol and di-beta-naphthyl-paraphenylenediamine. Other additives which can be incorporated in plastic materials and waxes according to the process of this invention, are cross-linking agents, e.g. organic peroxides, such as dicumyl peroxide and mesityl peroxide.

The concentrates, solutions or dispersions are advantageously added to the melts of plastics or waxes by means of measuring or dosing devices. The mixing of the concentrate with the melts can be effected in vessels with suitable stirring means.

The advantages of the process according to the invention are its simple mixing operations of additives and plastic or waxy melts, whereby the properties of the final products are in no way adversely affected; another important improvement is the excellent homogeneous distribution of the additives in the final product.

The process according to the invention will now be more fully described in a number of examples, but it should be understood that these are given by way of illustration and not of limitation and that many changes in the details can be made without departing from the spirit of the invention.

EXAMPLE 1

200 kg. of ethylene-vinylacetate wax, which contains 2% by weight of copolymerized vinyl acetate,[1] are melted at 120° C. in a heated stirring vessel, and to the melt are added within half an hour 50 kg. of a yellow pigment, while stirring. As stirring device, a stirrer is used having vanes reaching to the wall of the vessel, which are displaced for 45° with respect to each other and are provided with bores.

The so obtained dispersion is passed at a temperature of 120° C. into a storage vessel arranged below the stirring device. From the storage vessel 18.7 kg. per hour of pigment-wax-dispersion are continuously fed by means of a measuring pump into a conduit leading to a worm press for plastic melts. At the point where the dispersion reaches the conduit the latter is provided with a distension capable of housing a vigorous stirrer serving for the initial mixing of wax-pigment-dispersion with the polyethylene melt passing through the conduit. 735 kg. of the polyethylene melt having a melting index of 8 g./10 min. are passed hourly through the conduit. Subsequently, the mixture is passed through a worm press and subjected to head granulation. Obtained are 753.7 kg./hour of a yellow-colored granulate which still has a melt index of 8.2 g./10 min.

Examination of a microsection of one cm.² of the material showed excellent pigment distribution. Only three agglomerates were found having a diameter of 15–17 μm. From the material, pails were made by injection molding. There was no deterioration as regards corrosion of cracks produced by tension as compared to the uncolored starting material.

EXAMPLE 2

The same stirring vessel was used as in Example 1; in the vessel, 200 kg. of a wax consisting of ethylene-acrylic ethylester, containing 3% by weight of acrylicethyl ester as copolymer,[2] were melted at 125° C. and to the melt were added 50 kg. lamp-black and 2.5 kg. di-β-naphthyl-paraphenylenediamine. The so obtained mixture is discharged to a storage vessel. From the storage vessel, 71 kg. of the concentrate are introduced hourly by means of a measuring pump into a stirring vessel for plastic melt, into which 700 kg. polyethylene melt with a melt index 1.5 g./10 min. are continuously introduced per hour at a temperature of 150° C., where they are mixed with the concentrate, and from where they are discharged continuously over a worm press with a granulator head. In order to enhance the feeding of the mixture to the worm press, the stirring vessel is maintained under a pressure of 1.5 atm. Obtained are hourly 771 kg. of a black-colored stabilized polyethylene, having a melt index of 1.7 g./10 min. as compared to the starting material.

The examination of a microsection of one cm.² of the material showed homogeneous distribution of the lamp-black without agglomeration. The black-colored material was especially suitable for making pipes withstanding a nominal pressure of 10 atm. The mechanical parameters were not lowered as compared to uncolored polyethylene, nor was there an increased tendency to corrosion after cracking observed.

EXAMPLE 3

In a stirring vessel as described in Example 1, 250 kg. of an ethylene-vinylacetate wax, having a melting point of 105 to 115° C. with a vinylacetate content of 8% by weight,[3] as copolymer, were melted at 130° C., and to the melt were added while stirring 60 kg. 2,2'-methylene-bis-6-methylcyclohexyl-4-methylphenol. The solution so obtained is passed to a storage vessel, from where 4.4 kg. are hourly transferred by means of a measuring pump into a stirring vessel for a plastic melt. Into that vessel, 850 kg. polyethylene melt are continuously introduced hourly, having a melt index of 1.7 g./10 min.; the temperature of the melt is 170° C. The melt is stirred with the solution and continuously discharged over a worm press with granulator head. The stirring vessel is maintained under pressure of 2 atm. Obtained are hourly 854.4 kg. of a stabilized polyethylene.

The melt index remains unchanged as compared to the unstabilized polyethylene. The stabilizer is extraordinarily well distributed in the polyethylene, which is especially useful for making cables.

EXAMPLE 4

In a vessel as described in Example 1, 100 kg. of an ethylene-vinylacetate wax, having a copolymer content of 15% by weight of vinylacetate with a mean molecular weight of 2500, are melted at 125° C., the melt being subsequently cooled to 98° C. At that temperature the wax is still liquid. 11 kg. dicumyl peroxide are now dissolved in the wax melt whilst stirring and the solution obtained is discharged into the storage vessel. From there, 3.9 kg. of the wax-peroxide solution are hourly conveyed by a measuring pump in continuous flow to the stirring vessel for the plastic melt. Into the vessel, we also introduce 650 kg. per hour of an ethylene-vinylacetate copolymer having a melt index of 15 g./10 min. at a temperature of 125° C. and feed the mixture with the

---

[1] Having a mean molecular weight of 5000.
[2] With a mean molecular weight of 7000.
[3] Having a mean molecular weight of 1300.

peroxide concentrate whilst stirring to a worm press at a rate of flow through the press of 3.5 min. maintaining the temperature of the press at 160° C. Subsequently the copolymer which becomes crosslinked at a temperature of 160° C., is subjected to granulation.

Obtained are 653.5 kg. per hour of an ethylenevinyl acetate copolymer, with a content of 15% by weight of vinyl acetate in the copolymer, and a melt index of 2.1 g./10 min. The material possesses excellent pliability combined with high strength. Due to these properties it is very well suited for use in the cable industry.

What is claimed is:

1. A process of producing polyethylene master batches comprising the steps of (a) combining a particulate filler with a liquid medium consisting of a copolymer of ethylene with a member selected from the group consisting of vinyl acetate and acrylic esters, having an average molecular weight of 1200 to 8000, as solvent or dispersant for said additive, (b) thoroughly intermixing the additive and copolymer to make said mixture readily transportable in a concentrated form, and (c) combining the resultant concentrate with molten polyethylene.

2. Process according to claim 1 wherein said copolymer has an average molecular weight of from 1500 to 5000.

3. Process according to claim 1 wherein said copolymer contains 1–20% by weight of said vinyl acetate or acrylic ester.

4. Process according to claim 1 wherein said copolymer contains 2–10% by weight of said vinyl acetate or acrylic ester.

5. Process according to claim 1 wherein said filler is a stabilizer selected from the group consisting of 2,2-methylene-bis-6-methylcyclohexyl-4-methylphenol and di-beta-naphthyl-paraphenylenediamine.

6. Process according to claim 1 wherein said filler is a cross-linking agent selected from the group consisting of dicumyl peroxide and mesityl peroxide.

7. Process according to claim 1 wherein said filler is a pigment.

8. Process according to claim 1 wherein said filler is a lampblack.

References Cited

UNITED STATES PATENTS

| | | | |
|---|---|---|---|
| 3,375,219 | 3/1968 | Robb | 260—41 |
| 3,322,708 | 5/1967 | Wilson | 260—28.5 |
| 3,072,603 | 1/1963 | Tholstrup | 260—45.85 |

ALLAN LIEBERMAN, Primary Examiner

T. MORRIS, Assistant Examiner

U.S. Cl. X.R.

260—34.2, 41